United States Patent
Qiu et al.

(10) Patent No.: US 12,469,248 B2
(45) Date of Patent: Nov. 11, 2025

(54) METHOD, APPARATUS, DEVICE, AND STORAGE MEDIUM FOR TRAINING IMAGE PROCESSING MODEL

(71) Applicant: Tencent Technology (Shenzhen) Company Limited, Guangdong (CN)

(72) Inventors: Haibo Qiu, Shenzhen (CN); Dihong Gong, Shenzhen (CN); Zhifeng Li, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 366 days.

(21) Appl. No.: 17/961,345

(22) Filed: Oct. 6, 2022

(65) Prior Publication Data
US 2023/0033052 A1  Feb. 2, 2023

Related U.S. Application Data

(63) Continuation of application No. PCT/CN2021/112829, filed on Aug. 16, 2021.

(30) Foreign Application Priority Data

Aug. 20, 2020  (CN) .......................... 202010845864.9

(51) Int. Cl.
*G06V 10/26* (2022.01)
*G06V 10/82* (2022.01)
*G06V 40/16* (2022.01)

(52) U.S. Cl.
CPC ............ *G06V 10/273* (2022.01); *G06V 10/82* (2022.01); *G06V 40/172* (2022.01)

(58) Field of Classification Search
CPC .... G06V 10/273; G06V 10/82; G06V 40/162; G06V 40/171; G06V 40/172
See application file for complete search history.

(56) References Cited

U.S. PATENT DOCUMENTS

| | | | |
|---|---|---|---|
| 2016/0189006 A1 | 6/2016 | Iliadis et al. | |
| 2019/0205616 A1 | 7/2019 | Hong | |
| 2020/0082157 A1* | 3/2020 | Susskind | .............. G06V 40/169 |

FOREIGN PATENT DOCUMENTS

| | | |
|---|---|---|
| CN | 105095856 A | 11/2015 |
| CN | 106570464 A | 4/2017 |

(Continued)

OTHER PUBLICATIONS

Ge et al: "Detecting Masked Faces in the Wild with LLE-CNNs", CVPR, 2017. (Year: 2017).*

(Continued)

*Primary Examiner* — Ruiping Li
(74) *Attorney, Agent, or Firm* — Crowell & Moring LLP

(57) ABSTRACT

An image processing model can more accurately process a face image with an occluded face while reducing calculations and improving operation speed of a processing device, reducing training time and costs. A predicted recognition result of a sample face image and occlusion indication information based on an image processing model is obtained. The occlusion indication information indicates an image feature of a face occlusion area of the sample face image. A recognition error based on the predicted recognition result and a target recognition result is also obtained. A classification error is obtained based on the occlusion indication information and a target occlusion pattern corresponding to the sample face image. An occlusion pattern of the sample face image indicates a position and a size of the face occlusion area. A model parameter of the image processing model is updated based on the recognition error and the classification error.

20 Claims, 12 Drawing Sheets

(56) References Cited

FOREIGN PATENT DOCUMENTS

| | | | |
|---|---|---|---|
| CN | 107909065 A | | 4/2018 |
| CN | 108985257 A | | 12/2018 |
| CN | 110322416 A | | 10/2019 |
| CN | 111191616 A | * | 5/2020 |
| CN | 111488811 A | | 8/2020 |
| CN | 111914812 A | | 11/2020 |
| WO | WO 2019/128646 A1 | | 7/2019 |
| WO | WO 2020/015477 A1 | | 1/2020 |
| WO | WO 2022/037541 A1 | | 2/2022 |

OTHER PUBLICATIONS

A machine translated English version of document CN 111191616. (Year: 2020).*

Extended European Search Report for corresponding application No. EP 21857635.3 dated May 22, 2023, 11p.

Fong, Ruth et al., "Occlusions for Effective Data Augmentation in Image Classification", *IEEE, 2019 International Conference on Computer Vision Workshop (ICCVW)*, Oct. 27, 2019, pp. 4158-4166.

He, Kaiming et al., "Mask R-CNN", *IEEE, 2017 International Conference on Computer Vision (ICCV)*, Oct. 1, 2017, pp. 1-9.

Anonymous, "Mask R-CNN", *TensorFlow*, dated Dec. 4, 2017, retrieved from the Internet @ https://blog.csdn.net/Anymake_ren/article/details/78705629 on May 4, 2023, pp. 1-6, CN.

International Search Report and Written Opinion for priority application No. PCT/CN2021/112829 dated Nov. 17, 2021, 10p, in Chinese language.

English language translation of International Search Report for priority application No. PCT/CN2021/112829 dated Nov. 17, 2021, 2p.

First Office Action and Search Report for Chinese application No. 202010845864.9 dated Jun. 21, 2022, 9p, in Chinese language.

Concise Explanation of Relevance for A16.

Communication pursuant to Article 94(3) EPC for corresponding EP application No. 21 857 635.3 dated Jul. 25, 2024, 6p.

* cited by examiner

METHOD, APPARATUS, DEVICE, AND STORAGE MEDIUM FOR TRAINING IMAGE PROCESSING MODEL

RELATED APPLICATION

This application is a bypass continuation of PCT/CN/2021/112829, filed on Aug. 16, 2021, published as WO2022037541A, entitled "IMAGE PROCESSING MODEL TRAINING METHOD AND APPARATUS, DEVICE, AND STORAGE MEDIUM," which claims priority to Chinese Patent Application No. 202010845864.9, entitled "METHOD, APPARATUS, DEVICE, AND STORAGE MEDIUM FOR TRAINING IMAGE PROCESSING MODEL" filed on Aug. 20, 2020, each of which are incorporated herein by reference in their entirety.

FIELD OF THE TECHNOLOGY

This application relates to the field of artificial intelligence technologies, and in particular, to a method, apparatus, device, and storage medium for training an image processing model.

BACKGROUND OF THE DISCLOSURE

With the development of computer technologies, artificial intelligence has been widely applied in various fields. The use of artificial intelligence to replace human labor can greatly improve the efficiency of service processing. In terms of image processing, an image processing model can be trained based on artificial intelligence technologies to obtain a trained image processing model. After an image to be recognized is inputted to the trained image processing model, a corresponding processing result can be obtained.

SUMMARY

Embodiments of this application provide a method, apparatus, device, and storage medium for training an image processing model.

In one embodiment, a method for training an image processing model is provided, the method including:
  obtaining a predicted recognition result of a first sample face image and first occlusion indication information based on an image processing model, the first occlusion indication information being used for indicating an image feature of a face occlusion area of the first sample face image;
  obtaining a recognition error based on the predicted recognition result and a target recognition result corresponding to the first sample face image;
  obtaining a classification error based on the first occlusion indication information and a target occlusion pattern corresponding to the first sample face image, an occlusion pattern of the first sample face image being used for indicating a position and a size of the face occlusion area; and
  updating a model parameter of the image processing model according to the recognition error and the classification error.

In another embodiment, an image processing method is provided, the method including:
  performing feature extraction on a target face image to be recognized in response to an image processing instruction to obtain a second overall image feature of the target face image;
  determining second occlusion indication information corresponding to the second overall image feature, the second occlusion indication information being used for indicating an image feature of a face occlusion area of the target face image;
  removing the image feature of the face occlusion area from the second overall image feature according to the second occlusion indication information to obtain a second target image feature; and
  performing face recognition on the target face image based on the second target image feature.

In another embodiment, an apparatus for training an image processing model is provided, the apparatus including:
  a first obtaining module, configured to obtain a predicted recognition result of a first sample face image and first occlusion indication information based on an image processing model, the first occlusion indication information being used for indicating an image feature of a face occlusion area of the first sample face image;
  a second obtaining module, configured to obtain a recognition error based on the predicted recognition result and a target recognition result corresponding to the first sample face image;
  a third obtaining module, configured to obtain a classification error based on the first occlusion indication information and a target occlusion pattern corresponding to the first sample face image, an occlusion pattern of the first sample face image being used for indicating a position and a size of the face occlusion area; and
  an update module, configured to update a model parameter of the image processing model according to the recognition error and the classification error.

In another embodiment, an electronic device is provided, including one or more processors and one or more memories, the one or more memories storing at least one program code, the at least program code being loaded and executed by the one or more processors to implement the method for training an image processing model.

In another embodiment, a non-transitory computer-readable storage medium is provided, storing at least one program code, the at least program code being loaded and executed by a processor to implement the method for training an image processing model.

In another embodiment, a computer program product or a computer program is provided, including one or more program codes, the one or more program codes being stored in a non-transitory computer-readable storage medium. One or more processors of an electronic device read the one or more program codes from the non-transitory computer-readable storage medium, and execute the one or more program codes, to cause the electronic device to execute the method for training an image processing model.

In another embodiment, an electronic device is provided, including one or more processors and one or more memories, the one or more memories storing at least one program code, the at least program code being loaded and executed by the one or more processors to implement the image processing method.

In another embodiment, a non-transitory computer-readable storage medium is provided, storing at least one program code, the at least program code being loaded and executed by a processor to implement the image processing method.

In another embodiment, a computer program product or a computer program is provided, including one or more program codes, the one or more program codes being stored in a non-transitory computer-readable storage medium. One or more processors of an electronic device read the one or more program codes from the non-transitory computer-readable storage medium, and execute the one or more program codes, to cause the electronic device to execute the image processing method.

In the embodiments of this application, with the introduction of occlusion patterns, the predicted occlusion pattern of the sample face image is determined according to the occlusion indication information generated in the face recognition process, and is compared with the target occlusion pattern corresponding to the sample face image. In this way, the image processing model can be trained to determine more accurate occlusion indication information, and then perform face recognition based on the accurate occlusion indication information to obtain a more accurate recognition result. Therefore, the image processing model can more accurately process a face image where a face is occluded, that is, the image processing model provides higher robustness. In other words, the image processing model can directly process the sample face image to obtain a recognition result, and can perform image processing end-to-end without the aid of an external network, thereby significantly reducing the amount of calculation, increasing the operation speed of the device, and effectively reducing the number of models. Because the image processing accuracy of the image processing model is not affected by external network factors, the accuracy may be improved.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may understand other embodiments according to these accompanying drawings without creative efforts.

DESCRIPTION OF EMBODIMENTS

Figure 1:
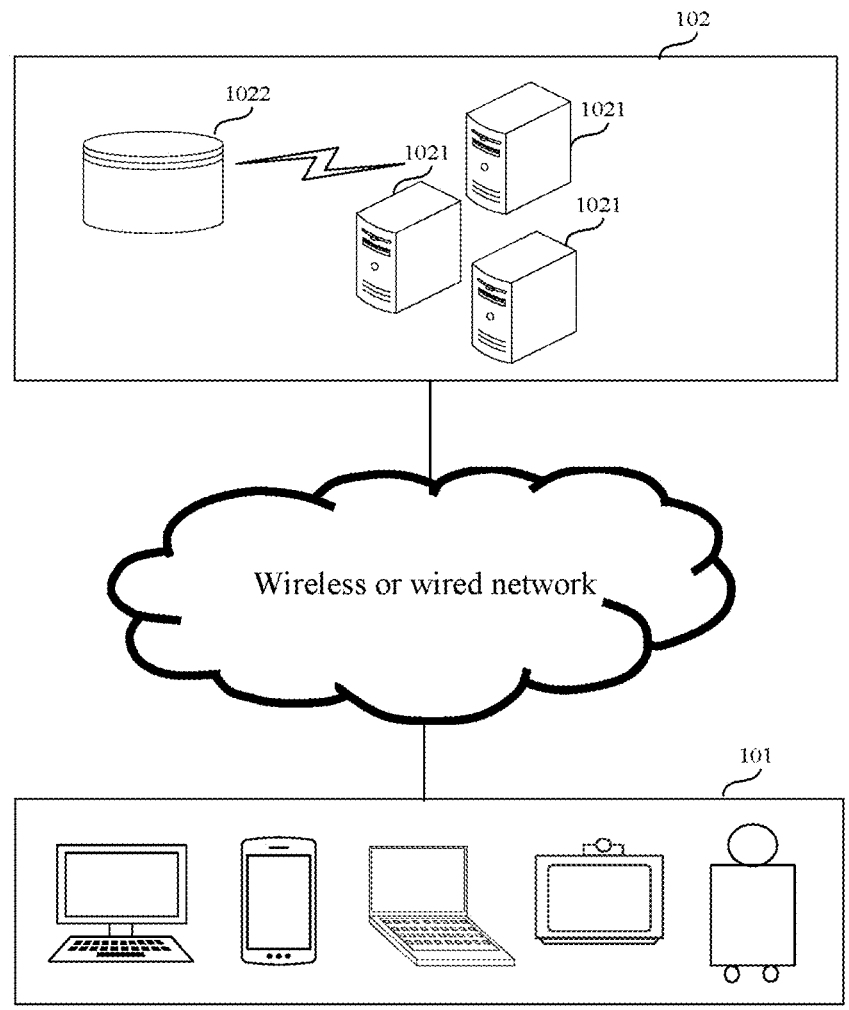
FIG. 1 is a schematic diagram of an implementation environment of a method for training an image processing model according to an embodiment of this application.

The objectives, technical solutions, and advantages of this application are described in further detail below with reference to the accompanying drawings.

The terms "first", "second", and the like in this application are used for distinguishing between same items or similar items of which effects and functions are basically the same. It is to be understood that, the "first", "second", and "nth" do not have a dependency relationship in logic or time sequence, and a quantity and an execution order thereof are not limited. It is also to be understood that although the following description uses the terms first, second, etc. to describe elements, the elements are not limited by the terms. The terms are only used to distinguish one element from another. For example, a first image may be referred to as a second image, and similarly, a second image can be referred to as a first image without departing from the scope of the various examples. Both the first image and the second image may be images, and in some cases, be separate and different images.

In this application, the term "at least one" refers to one or more. In this application, the term "plurality of" or "multiple" refers to two or more. For example, a plurality of data packets refers to two or more data packets.

It is also to be understood that, as used herein, the term "and/or" refers to and includes any and all possible combinations of one or more of the associated listed items. The term "and/or" describes an association relationship for describing associated objects and represents can three relationships may exist. For example, A and/or B may represent the following three cases: Only A exists, both A and B exist, and only B exists. In addition, the character "/" in this application generally indicates an "or" relationship between associated objects.

It is to be understood that sequence numbers of the foregoing processes do not mean execution sequences in various embodiments of this application. The execution sequences of the processes may be determined according to functions and internal logic of the processes, and are not intended to be construed as any limitation on the implementation processes of the embodiments of this application.

It is also to be understood that determining B based on A does not mean determining B based only on A, but may also be determining B based on A and/or other information.

Terms involved in this application are explained below.

A face occlusion area refers to an occluded area of a face in an image.

Convolutional feature: It is the output of a convolution layer of a deep convolutional network, and is generally a three-dimensional tensor with C channels, height H, and width W, i.e., $f(\cdot) \in R^{C*H*W}$. A convolutional feature element refers to a tensor element with coordinates (C, H, W). The tensor concept is a generalization of the vector concept. A vector is a first-order tensor. In some embodiments, a tensor is a multilinear function that can be used to represent a linear relationship between some vectors, scalars, and other tensors.

Feature mask: It is a three-dimensional tensor of the same size as the convolutional feature. The value of each bit element in the feature mask is in a range of [0, 1]. In some embodiments, a function of the feature mask is to remove a polluted feature element. The polluted feature element is a feature element of the face occlusion area.

End-to-end system: It means that the system obtains an expected output from an input by relying on itself without the aid of an external network or system. End-to-end refers to the above-mentioned way of relying only on the system itself to obtain the expected output from the input.

Robustness: In the computer field, it refers to the ability of a system to survive abnormal and dangerous situations. For example, whether a computer software can survive an input error, disk failure, network overload, or intentional attacks is the robustness of the computer software. The so-called "robustness" also refers to the ability of a system to maintain function even with changes in internal structure or external environment.

The implementation environment of this application will be described below.

FIG. 1 is a schematic diagram of an implementation environment of a method for training an image processing model according to an embodiment of this application. The implementation environment includes a terminal 101, or the implementation environment includes a terminal 101 and an image processing platform 102. The terminal 101 is connected to the image processing platform 102 via a wireless or wired network.

The terminal 101 may be a smart phone, a game console, a desktop computer, a tablet computer, an ebook reader, a Moving Picture Experts Group Audio Layer III (MP3) player, a Moving Picture Experts Group Audio Layer IV (MP4) player, a laptop portable computer, a security check device, an attendance device, or the like. The terminal 101 is installed with and runs an application supporting training of an image processing model. For example, the application can be a security check application, an attendance application, a system application, an instant messaging application, a shopping application, an online video application, and a social networking application.

In some embodiments, the terminal 101 has an image capture function and an image processing function, can perform image processing on a captured image and execute a corresponding function according to a result of the processing. The terminal 101 can complete this work independently, or the image processing platform 102 can provide a data service or image processing service to the terminal.

In some embodiments, the image processing platform 102 can obtain a sample face image to train an image processing model. After capturing an image, the terminal 101 transmits the captured image to the image processing platform 102, so that the image processing platform 102 provides an image processing service to the terminal 101 based on the trained image processing model.

The image processing platform 102 includes at least one of a server, a plurality of servers, a cloud computing platform, and a virtualization center. The image processing platform 102 is configured to provide a background service to the application supporting training of the image processing model. In some embodiments, the image processing platform 102 is responsible for primary processing work, and the terminal 101 is responsible for secondary processing work; or, the image processing platform 102 is responsible for secondary processing work, and the terminal 101 is responsible for primary processing work; or, the image processing platform 102 or the terminal 101 are respectively responsible for processing work alone. Alternatively, a distributed computing architecture is used for collaborative computing between the image processing platform 102 and the terminal 101.

In some embodiments, the image processing platform 102 includes at least one server 1021 and a database 1022. The database 1022 is configured to store data. In the embodiments of this application, the database 1022 can store sample face images and provide a data service to the at least one server 1021.

The server 1021 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto.

It can be understood by a person skilled in the art that there may be more or fewer terminals 101 and servers 1021. For example, there may be one terminal 101 and one server 1021, or there may be dozens or hundreds (or more) of terminals 101 and servers 1021. The number of terminals and the number of servers are not limited in the embodiments of this application. In addition, the device type of the terminal or the server is also not limited in the embodiments of this application.

Application scenarios of this application will be described below.

By the method for training an image processing model according to the embodiments of this application, after an image processing model is obtained by training, the image processing model can provide an image processing service. The image processing service can be applied to any face recognition scenario. In any face recognition scenario, regardless of whether a face in a captured face image is occluded, the face can be accurately recognized by the image processing model. For example, the image processing model may be applied to a face recognition scenario such as an attendance system, a security check system, face unlocking of a mobile phone or computer, or a face recognition payment. A user uploads an non-occluded face image when the system is initially established. The non-occluded face image is stored in a system database as an image to be recognized. During recognition, the image to be recognized of the user is used, and no other operations are required.

Figure 2:
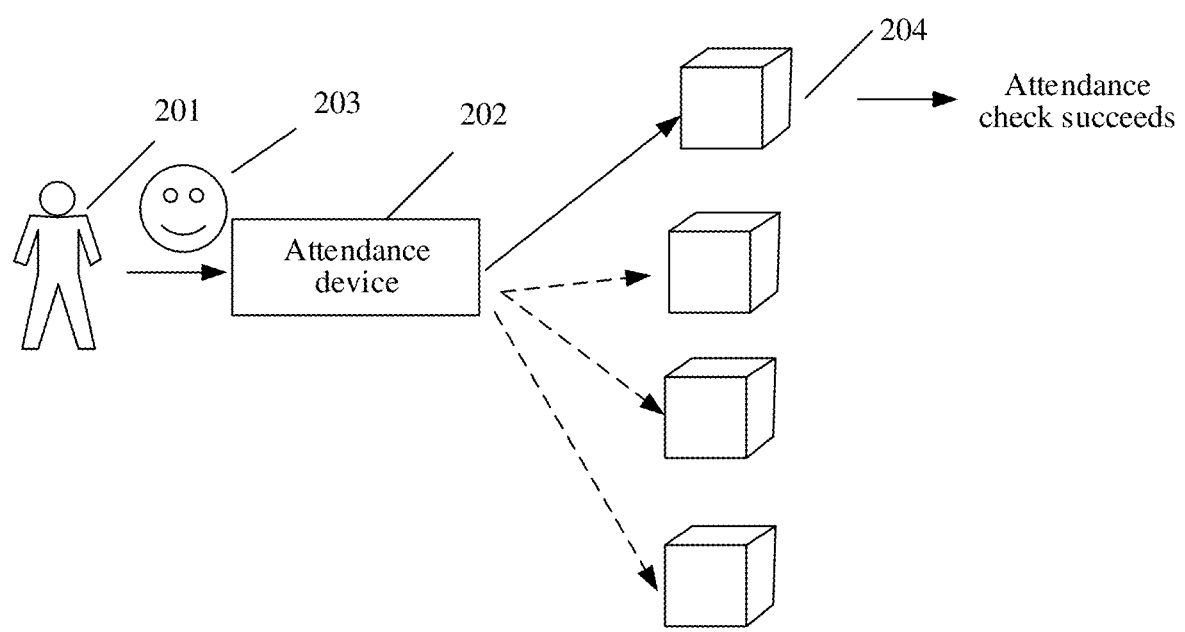
FIG. 2 is a schematic diagram of an attendance system according to an embodiment of this application.

For example, in the application scenario of attendance, as shown in FIG. 2, in an attendance system 200, a user 201 stands in front of a camera of an attendance device 202. The attendance device 202 captures a face image 203 for the user 201, and then performs face recognition on the face image 203, to determine. After identity information 204 of the user 201 is determined, it can be recorded that the user corresponding to the identity information 204 has clocked in. Of course, in other application scenarios, the attendance device 202 can be replaced by other devices. For example, in a security check system, the attendance device can be replaced by a security check device, and after the identity information is identified, "identity verification passed" may be displayed, or a security check facility allows access.

Figure 3:
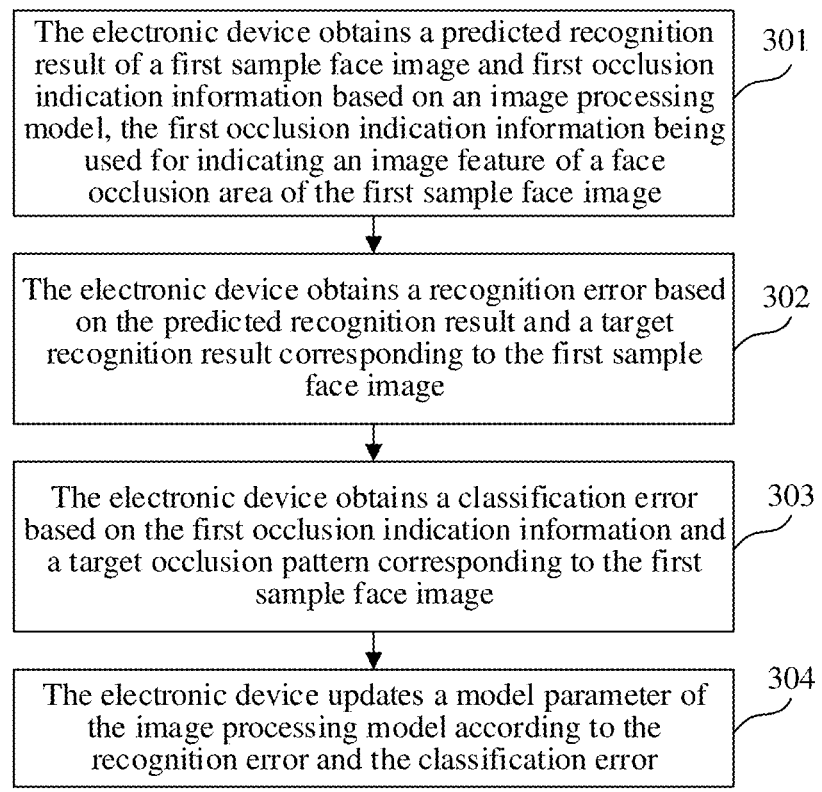
FIG. 3 is a flowchart of a method for training an image processing model according to an embodiment of this application.

FIG. 3 is a flowchart of a method for training an image processing model according to an embodiment of this application. The method is applied to an electronic device, and the electronic device is a terminal or a server. Referring to FIG. 3, the method includes the following steps.

301. The electronic device obtains a predicted recognition result of a first sample face image and first occlusion indication information based on an image processing model, the first occlusion indication information being used for indicating an image feature of a face occlusion area of the first sample face image.

The first sample face image is an image including a face, and the image including a face is used as a sample to train the image processing model. Samples (or specimens) are a part of individuals to be observed or investigated.

In the embodiments of this application, the image processing model is configured to process the inputted first sample face image, and output a predicted recognition result. The first sample face image may include a face image without occlusion or a face image with occlusion. During the training process, the image processing model is trained based on the first sample face image. Correspondingly, during use, regardless of whether a target face image to be recognized is occluded or not, the image processing model can accurately recognize the face.

In the process of image processing, the image processing model can perform feature extraction on the first sample face image, and then determine which image features are affected by the face occlusion area, remove these image features, and perform face recognition based on the image features of non-occluded face areas. The first occlusion indication information is used to identify the image features affected by the face occlusion area, and these image features affected by the face occlusion area may be used as polluted image features.

In step 301, a model parameter of the image processing model may be an initial value. The initial value may be obtained by initialization, or may be an initial value obtained by pre-training other first sample face images, which is not limited in the embodiments of this application.

302. The electronic device obtains a recognition error based on the predicted recognition result and a target recognition result corresponding to the first sample face image.

The recognition error is used to determine whether the model parameter of the image processing model should be adjusted and how to adjust the model parameter, so as to improve the image processing accuracy of the image processing model.

During the training process, the predicted recognition result outputted by the image processing model is a recognition result predicted by the image processing model, and may also be referred to as a "predicted value". The accuracy of the predicted recognition result is consistent with the image processing accuracy of the image processing model. The target recognition result marked on each first sample face image is a real and correct recognition result, which may also be referred to as a "true value". The recognition error obtained by comparing the "predicted value" and the "true value" can measure the accuracy of the predicted recognition result, and therefore can measure the image processing accuracy of the image processing model.

It can be understood that, a larger recognition error indicates a lower image processing accuracy of the image processing model, and a smaller recognition error indicates a higher image processing accuracy of the image processing model.

303. The electronic device obtains a classification error based on the first occlusion indication information and a target occlusion pattern corresponding to the first sample face image.

An occlusion pattern of the first sample face image is used for indicating a position and a size of the face occlusion area.

In some embodiments, the obtaining a classification error based on the first occlusion indication information and a target occlusion pattern corresponding to the first sample face image includes: determining a predicted occlusion pattern of the first sample face image based on the first occlusion indication information; and then obtaining the classification error based on the predicted occlusion pattern and the target occlusion pattern. Determining the predicted occlusion pattern of the first sample face image is classifying the occlusion pattern of the first sample face image, to obtain the predicted occlusion pattern.

The positions or sizes of the face occlusion areas in different first sample face images may be different. Therefore, the image features affected by the face occlusion areas are different, that is, the first occlusion indication information is different. According to the different positions and sizes of the face occlusion areas, different occlusion patterns are set, and each occlusion pattern corresponds to the position and size of a face occlusion area.

The predicted occlusion pattern is the "predicted value", and the target occlusion pattern is a real and correct occlusion pattern, that is, a "true value". The classification error obtained by comparing the "predicted value" and the "true value" of the occlusion pattern can measure the accuracy of the predicted occlusion pattern. Since the predicted occlusion pattern is determined based on the first occlusion indication information, the accuracy of the first occlusion indication information can also be measured.

In the training process, supervised learning of occlusion patterns is introduced, which can supervise the ability of the image processing model to learn accurate first occlusion indication information, and then perform face recognition according to the accurate first occlusion indication information and image features, thereby obtaining a more accurate recognition result.

304. The electronic device updates a model parameter of the image processing model according to the recognition error and the classification error.

In the training process, both the recognition error and the classification error are considered, where the recognition error trains the image processing model to have good face recognition ability, and the classification error trains the image processing model to output more accurate first occlusion indication information, thereby improving the accuracy of face recognition.

On the one hand, in the embodiments of this application, with the introduction of occlusion patterns, the predicted occlusion pattern of the first sample face image is determined according to the first occlusion indication information generated in the face recognition process, and is compared with the target occlusion pattern marked on the first sample face image. In this way, the image processing model can be trained to output more accurate occlusion indication information, and then perform face recognition based on the accurate occlusion indication information to obtain a more accurate recognition result. In other words, the image processing model can more accurately process a face image where a face is occluded, that is, the image processing model provides higher robustness. On the other hand, the image processing model can directly process the first sample face image to obtain a recognition result, and can perform image processing end-to-end without the aid of an external network, thereby significantly reducing the amount of calculation, increasing the operation speed of the device, and effectively reducing the number of models. Because the image processing accuracy of the image processing model is not affected by external network factors, the accuracy is significantly improved.

An example method for training an image processing model is provided below, compared with the method provided in this application and analyzed.

Figure 4:
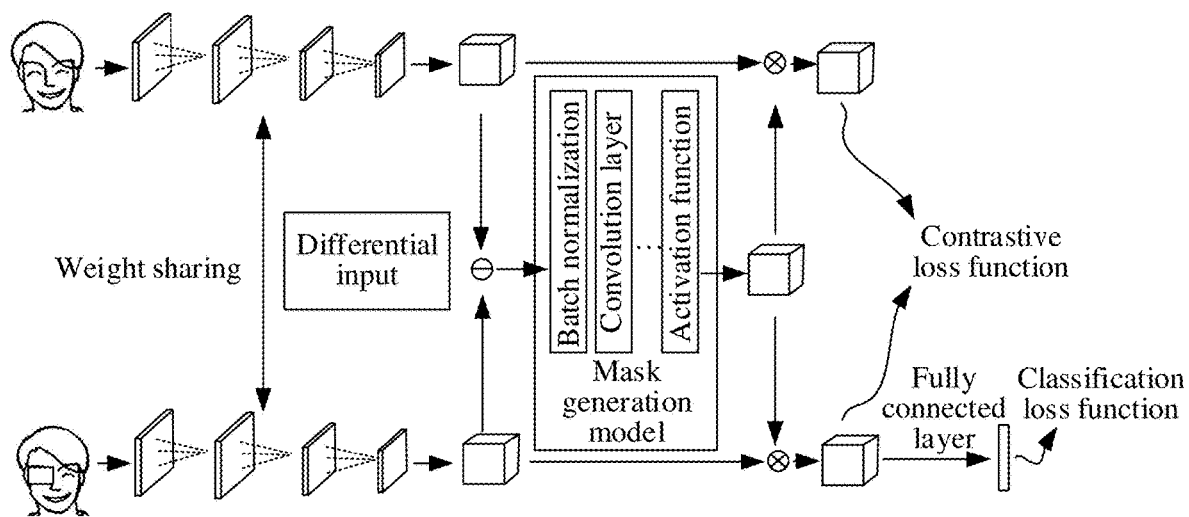
FIG. 4 is a schematic diagram of an example method for training an image processing model.
Figure 5:
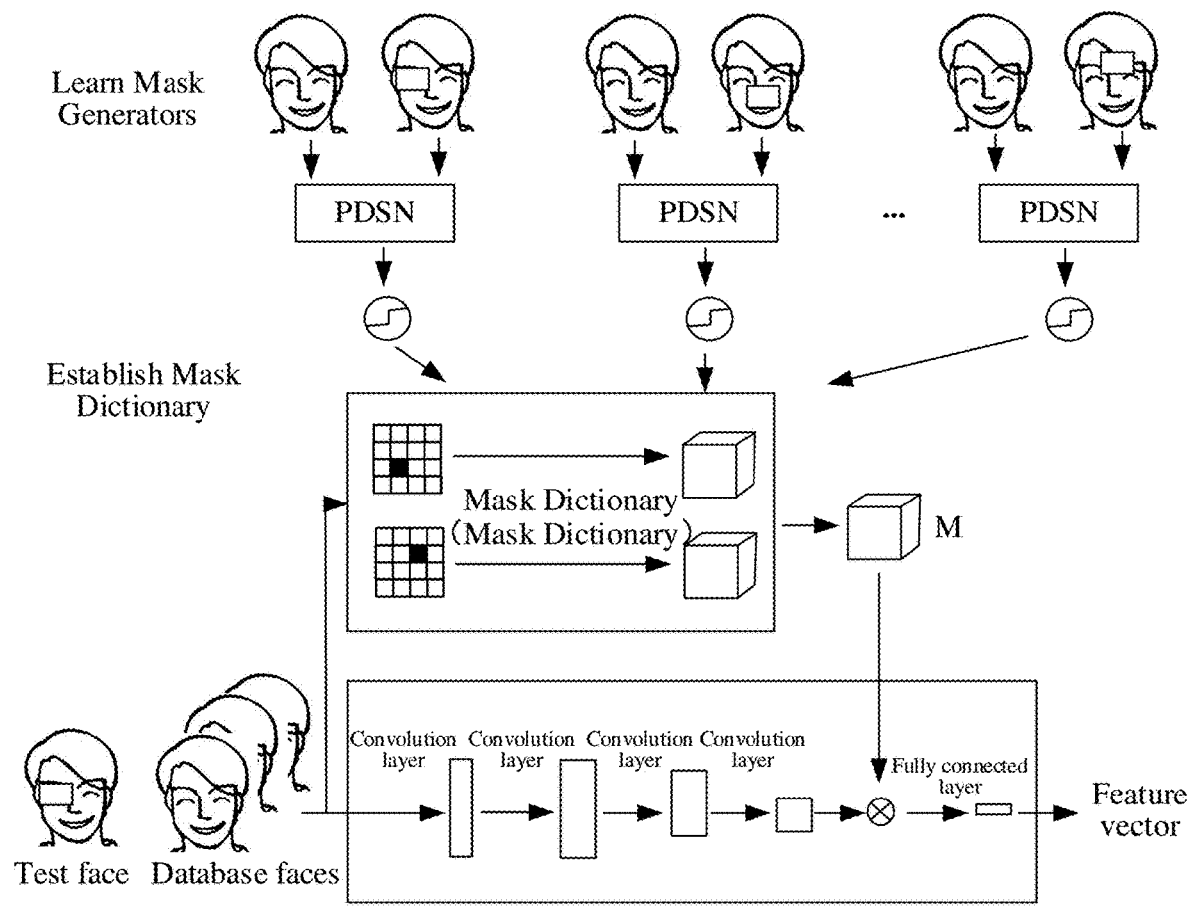
FIG. 5 is a schematic diagram of an example method for using an image processing model.

FIG. 4 and FIG. 5 respectively show an example method for training an image processing model and a method for using an image processing model. FIG. 4 shows a pairwise differential siamese network, which can explicitly learn a mapping relationship between a face occlusion area and image features affected by the face occlusion area, and may be referred to as Learn Mask Generators. Based on the mapping relationship, a dictionary of correspondence between an occlusion block (face occlusion area) and a mask is established. The mask is used for indicating the image feature that is greatly affected by the face occlusion area. This process is an Establish Mask Dictionary process. Each index item in the mask dictionary represents the image feature that is greatly affected when a particular area on the face is occluded. If each element in the image feature is referred to as a convolution feature element, each index item in the dictionary represents the top-level convolutional feature element that is greatly affected when a particular area on the face is occluded. As shown in FIG. 5, during testing, a fully convolutional network (FCN) is used to detect a face occlusion area of an inputted face image, obtain convolutional feature elements that might be removed under this occlusion condition according to the dictionary, uses a mask to remove these convolutional feature elements, and then performs recognition.

The mapping relationship is learned through an external network (the pairwise differential siamese network), and is established as a dictionary. Subsequently, when training the image processing model or using the image processing model, a face occlusion area is detected through the external network, a mapped-to mask is obtained by looking up the dictionary, and the image processing model performs face recognition based on the mapped-to mask. The image processing model relies on the external network, and the external network is trained separately from the image processing model. The presence of the external network leads to a significant increase in the amount of calculation, slowing down the operation of the device. The accuracy with which the external network detects the face occlusion area also greatly affects the determination of the feature elements that may be removed. That is, if the detection of the face occlusion area is inaccurate, the subsequent removal of the polluted feature elements may also be inaccurate, affecting the final face recognition.

On the one hand, the image processing model provided in the embodiments of this application is an end-to-end system. The image processing model can dynamically learn a mapping relationship between a face occlusion area and image features affected by the face occlusion area based on an inputted face image without the aid of an external network. Therefore, the image processing model can directly output a recognition result based on the inputted face image, thereby significantly reducing the amount of calculation, increasing the operation speed of the device, and effectively reducing the number of models. Because the image processing accuracy of the image processing model is not affected by external network factors, the accuracy is significantly improved.

On the other hand, with the introduction of occlusion patterns in the embodiments of this application, the image processing model can be trained to output more accurate first occlusion indication information, thereby improving the image processing accuracy of the image processing model. In other words, the image processing model can more accurately process a face image where a face is occluded, that is, the image processing model provides higher robustness.

In addition, in the process of establishing a dictionary of correspondence between occlusion blocks and masks, a face is divided into 9 different areas. For each area, one network is trained independently to learn a mapping for that area. That is to say, 9 different models are trained while establishing the dictionary, which greatly increases the training time and training costs. The large number of models occupy a large storage space and cannot be easily deployed to practical applications.

In the embodiments of this application, one image processing model is trained, and the image processing model can dynamically determine first occlusion indication information according to the face image, thereby reducing the model training time and training costs. Compared with the 9 models, the image processing model of this application can be more easily deployed on various types of devices to implement the corresponding image processing functions. Therefore, the image processing model of this application provides increased applicability and practicability.

Figure 6:
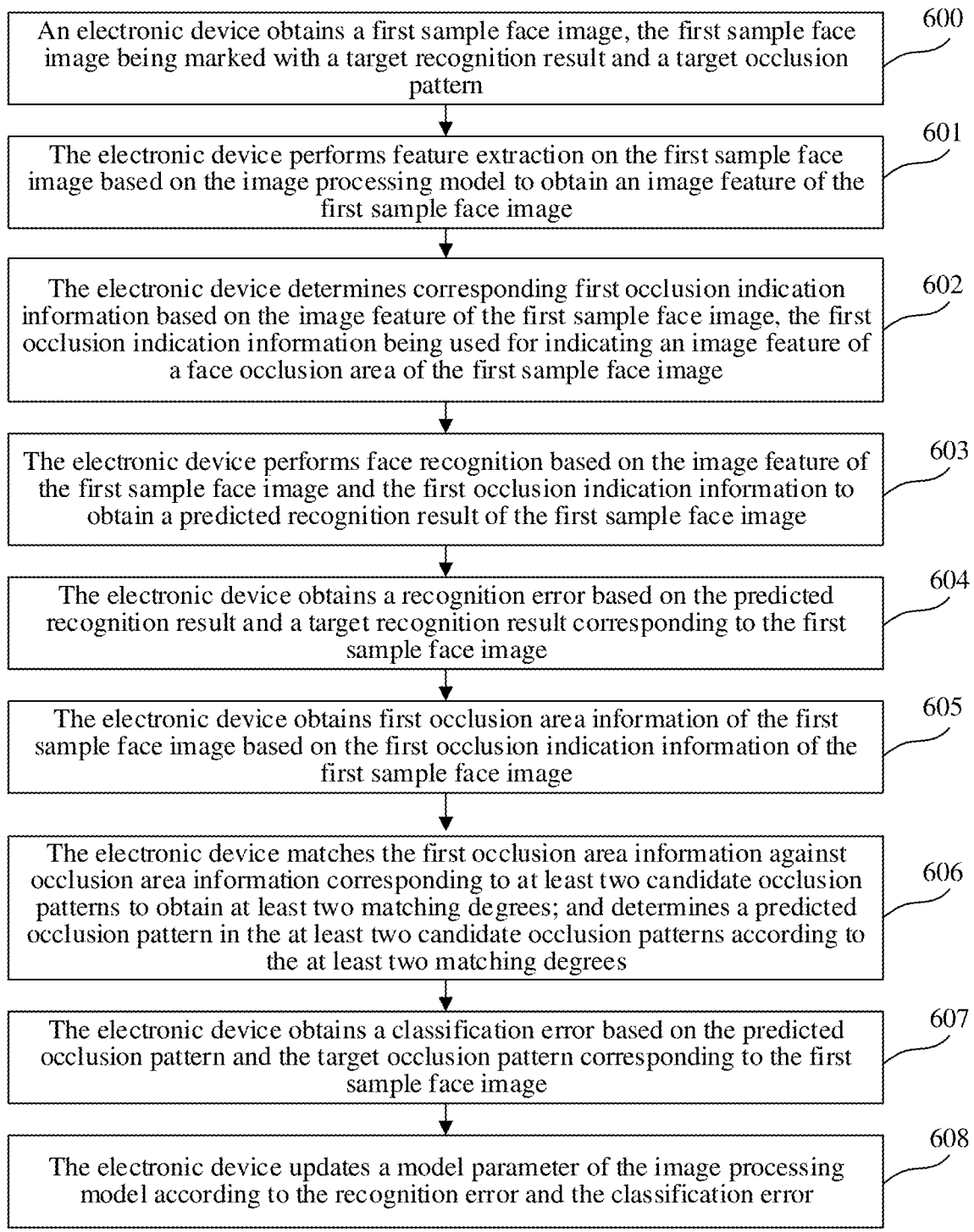
FIG. 6 is a flowchart of a method for training an image processing model according to an embodiment of this application.

FIG. 6 is a flowchart of a method for training an image processing model according to an embodiment of this application. The method is applied to an electronic device, and the electronic device is a terminal or a server. Referring to FIG. 6, the method includes the following steps.

600. An electronic device obtains a first sample face image, the first sample face image being marked with a target recognition result and a target occlusion pattern.

The first sample face image may include a non-occluded face image or an occluded face image. The non-occluded face image refers to an image where no face is occluded, and may be referred to as a clean face image. An occluded face image refers to an image where a face is occluded, and may be referred to as a face image with occlusion.

Figure 7:
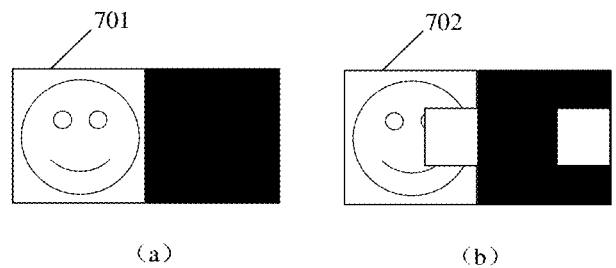
FIG. 7 is a schematic diagram of a face image according to an embodiment of this application.

For example, as shown in (a) of FIG. 7, a face in the image 701 is completely displayed and is not occluded, so the image 701 is a non-occluded face image and a clean face image. As shown in (b) of FIG. 7, a part of a face in an image 702 is occluded by another picture or other patterns, and only part of the face can be clearly seen from the image 702, so the image 702 is an occluded face image or a face image with occlusion.

For the process of obtaining the first sample face image, the electronic device may obtain the first sample face image in various manners depending on different storage addresses of the first sample face image. In some embodiments, the first sample face image may be stored in an image database, and the electronic device may retrieve the first sample face image from the image database when training an image processing model.

In some other embodiments, the first sample face image may be a resource in a website, and the electronic device can download the first sample face image from the target website.

In some other embodiments, the first sample face image may be stored in the electronic device. For example, the first sample face image is a historical image transmitted to the electronic device by another device or is an image generated by the electronic device, and the electronic device may retrieve the first sample face image from a local storage space.

The above provides several possible implementations of obtaining the first sample face image. The electronic device may also obtain the first sample face image in other manners. The method of obtaining the first sample face image is not particularly limited in the embodiments of this application.

As for the target recognition result, the target recognition result varies with the recognition function of the image processing model. For example, when the image processing model is used to perform identity authentication on the face in the image, the target recognition result is identity authentication information. In another example, when the image processing model is used to identify a face attribute or face type of the face in the image, for example, determining whether the face wears glasses or determining the gender of the face, etc., the target recognition result is the face attribute or face type.

In some embodiments, the target recognition result may be stored together with the first sample face image, and the first sample face image is marked with the target recognition result. For example, when obtaining the first sample face image, the electronic device may obtain the first sample face image and the corresponding target recognition result.

In some other embodiments, the target recognition result is determined based on a marking operation. For example, relevant technical personnel may mark first sample face images, and mark a target recognition result corresponding to each first sample face image.

As for the target occlusion pattern, the target occlusion pattern is used for indicating the position and size of the face occlusion area in the first sample face image. The first sample face image may include a plurality of occlusion patterns, and the target occlusion pattern is one of the plurality of occlusion patterns.

In some embodiments, the first sample face image or the target face image to be recognized may include at least two areas, each occlusion pattern corresponds to occlusion area information, and the occlusion area information is used for indicating whether each of the at least two areas is occluded. A plurality of occlusion patterns may be divided according to different face occlusion areas.

In some embodiments, the first sample face image or the target face image to be recognized can be divided into K*K areas, and each area represents a small block (i.e., an image block) that may be occluded in the face. K is an integer greater than 1. In this way, different occlusion patterns can be obtained when different areas are occluded.

The electronic device may obtain the number of occlusion patterns according to the number of areas divided. In some embodiments, each area has two states: occluded and non-occluded, so the occlusion status may be divided into $2^{K*K}$ different occlusion patterns. For example, when K is 4, there are 65536 different occlusion patterns.

In some embodiments, considering the exponential relationship between the number of occlusion patterns and the number of areas, increasing K to obtain a finer division of the face will lead to an exponential increase in the number of occlusion patterns. This may affect the image processing speed. Therefore, a novel occlusion pattern determination mechanism is proposed herein. It is found through the observation of face images that adjacent areas are generally in similar occlusion states, that is, when an area is occluded, there is a high possibility that an area adjacent to the occluded area is occluded. For example, when a left eye area is occluded, a right eye area probably is also occluded. This feature is called proximity. Based on the proximity, the face occlusion area can be constrained, so as to determine a small number of occlusion patterns.

Figure 8:
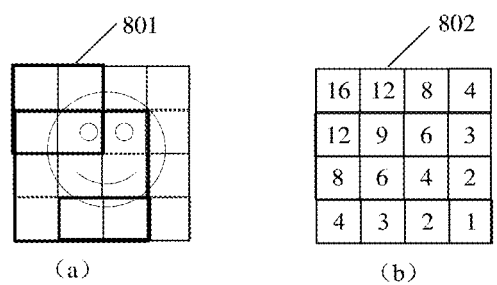
FIG. 8 is a schematic diagram showing face occlusion areas and determining of the number of occlusion patterns according to an embodiment of this application.

In some embodiments, it is constrained that the occlusion patterns cover m*n areas, where m and n are in a range of [1, K], and m and n are the width and height of the face occlusion area respectively. For example, (a) of FIG. 8 shows the positions and sizes of a face occlusion area 801 (marked with bold lines) in several occlusion patterns when K is 4. A face occlusion area in a face image is a connected domain, and the face occlusion area is a quadrilateral area. In this way, the electronic device may obtain the number of occlusion patterns according to the number of areas into which the face is divided. For example, (b) of FIG. 8 shows the change of the number of occlusion patterns 802 with the size of the face occlusion area when K is 4. A value at a position (i, j) in this matrix represents the number of occlusion patterns when the size of the face occlusion area is (i*j). For example, a value at a position (1,1) is 16. This value means that when the size of the face occlusion area is 1*1, there may be 16 occlusion patterns, that is, when the face occlusion area corresponds to 16 occlusion patterns when located in 16 areas. Values at other positions in the matrix can be calculated in the same way. When K is 4, 101 occlusion patterns can be determined. In some embodiments, (b) in FIG. 8 shows that a total of 16+12+12+8+8+9+4+6+6+4+3+4+3+2+2+1=100 cases where the face is occluded, and one case where the face is not occluded.

601. The electronic device performs feature extraction on the first sample face image based on the image processing model to obtain an image feature of the first sample face image.

The image feature of the first sample image may also be referred to herein as a first overall image feature.

The image processing model is an initial model, and the electronic device may input the first sample face image into the image processing model, so that the image processing model processes the first sample face image. In some embodiments, the electronic device may perform feature extraction on the first sample face image, and use the image feature to express pixel characteristics or the relationship between pixels of the first sample face image.

In some embodiments, before performing feature extraction on the first sample face image, the electronic device may first preprocess the first sample face image, and then perform feature extraction on the preprocessed first sample face image. The preprocessing process makes the first sample face image more in line with a feature extraction specification during feature extraction, so as to increase the processing efficiency, reduce the computational complexity and the amount of computation, and improve the accuracy of the extracted image feature. In some embodiments, step 601 can be implemented by the following steps 6011 and 6012. In this implementation, steps 601 to 602 are a process of preprocessing the first sample face image based on the image processing model and obtaining the image feature of the first sample face image and the first occlusion indication information corresponding to the image feature based on the preprocessed first sample face image.

6011. Preprocess the first sample face image based on the image processing model.

The image processing model can preprocess the first sample face image, to remove information irrelevant to face recognition, or add or correct some missing or incorrect information.

In some embodiments, the preprocessing process includes a face detection process and a face alignment process.

In some embodiments, the electronic device performs face detection on the first sample face image based on the image processing model, and crops the first sample face image based on a result of the face detection to obtain the preprocessed first sample face image.

It can be understood that, background content in the first sample face image has little effect on face recognition, and what the face recognition requires is the image feature of the face area. Through face detection, the electronic device can determine positions of key points of the face, and crop the face area as the preprocessed first sample face image according to the positions of the key points of the face. In this way, redundant information is removed from the first sample face image during feature extraction, thereby reducing the amount of calculation required for feature extraction. In addition, the image feature of the face area is prominently presented in the extracted image features, and using such an image feature for face recognition can effectively improve the recognition accuracy.

In some embodiments, a face image template may be provided, and positions of facial parts are marked in the face image template. As for face detection, the electronic device can detect coordinate positions of the left eye, right eye, nose, left and right mouth corners in the face image, and then crop the first sample face image according to a mapping relationship between the coordinate positions of the five key points and the positions of the facial parts in the face image template to obtain the preprocessed first sample face image. The cropping process may be understood as aligning the face in the first sample face image to a unified template position through affine transformation, and cropping to a fixed size.

The preprocessing process may be implemented by an algorithm related to face preprocessing. For example, the preprocessing process may be implemented using a Multi-Task Convolutional Neural Network (MTCNN) algorithm.

Of course, the preprocessing process may also be implemented in other manners. For example, the electronic device may also perform outlier processing, grayscale transformation, etc. on the first sample face image, which is not limited in the embodiments of this application.

6012. Perform feature extraction on the preprocessed first sample face image.

After preprocessing the first sample face image, the electronic device converts image pixel information in the preprocessed first sample face image into an image feature. The image feature is used for indicating the image pixel information, a relationship between neighboring pixels in the image, etc.

In some embodiments, the feature extraction process may be implemented by a Convolutional Neural Network (CNN). The electronic device may input the preprocessed first sample face image into the convolutional neural network, which obtains the first overall image feature through convolution processing. In some embodiments, the convolutional neural network can also implement the above preprocessing process. In some other embodiments, the above preprocessing process is performed by another convolutional neural network, which is not limited in the embodiments of this application.

In some embodiments, the image feature is expressed as (C, H, W), where C represents channels, H represents the height, and W represents the width. In response to the image features being obtained through a convolutional neural network, the image feature may be referred to as a convolutional feature. The convolutional neural network may include multiple convolution layers. Multiple layers of convolution operations may be performed on the preprocessed first sample face image to obtain a convolutional feature (that is, image feature) with a very strong expressive ability. C is consistent with the number of output channels of the last convolution layer of this convolutional neural network. In some embodiments, the convolutional neural network may adopt any framework capable of accurate feature extraction. For example, the LResnet50E-IR framework may be adopted. Of course, other frameworks, such as the GoogLeNet framework, may also be adopted. The framework of the convolutional neural network is not limited in the embodiments of this application.

In some embodiments, assuming that the preprocessing and feature extraction are implemented by the convolutional neural network, the electronic device may first pre-train the convolutional neural network based on non-occluded face images, and after the pre-training, fine-tune the model parameter of the image processing model based on the first sample face image obtained in step 600. In some embodiments, before step 601, the electronic device may train the convolutional neural network based on a second sample face image, a face in the second sample face image being not occluded.

By pre-training the convolutional neural network with clean face images, the convolutional neural network has prior knowledge of processing non-occluded face images. Then, by fine-tuning the model parameter of the image processing model based on non-occluded and occluded face images, the image processing model has a better image processing effect.

Figure 9:
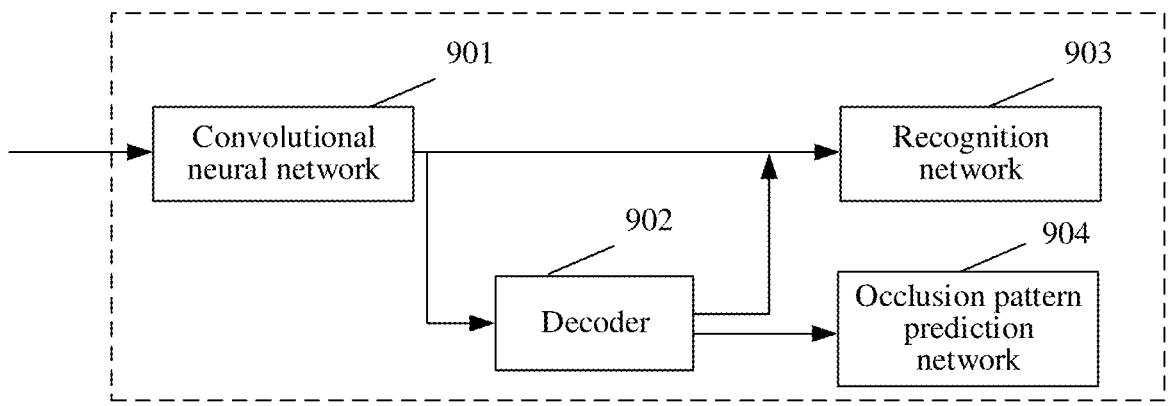
FIG. 9 is a schematic structural diagram of an image processing model according to an embodiment of this application.

In some embodiments, the structure of the image processing model may be shown in FIG. 9. The image processing model includes a convolutional neural network 901, a decoder 902, a recognition network 903, and an occlusion pattern prediction network 904. The convolutional neural network 901 is configured to execute step 601. The decoder 902 is configured to execute step 602, that is, the operation of obtaining the first occlusion indication information. The recognition network 903 is configured to execute step 603, that is, perform the face recognition based on the image feature obtained in step 601 and the first occlusion indication information obtained in step 602, to obtain the predicted recognition result of the first sample face image. The occlusion pattern prediction network 904 is configured to execute step 605, that is, classify the occlusion pattern of the first sample face image based on the first occlusion indication information obtained in step 602, to obtain a predicted occlusion pattern.

602. The electronic device determines corresponding first occlusion indication information based on the image feature of the first sample face image, the first occlusion indication information being used for indicating an image feature of a face occlusion area of the first sample face image.

After the electronic device obtains the first overall image feature, some image features in the first overall image feature that are affected by the face occlusion area may interfere with face recognition. Therefore, the electronic device may analyze which image features are affected by the face occlusion area, and then execute the following step 603 to remove the impact of this part of image features, thereby improving the accuracy of face recognition.

In some embodiments, the first occlusion indication information may be in the form of a feature vector, and a value of each bit element in the feature vector is used for indicating whether the image feature element is affected by the face occlusion area. For example, the value of each bit element is used for representing the probability that the corresponding image feature element is affected by the face occlusion area. In some embodiments, the first occlusion indication information may be in the form of a mask, and the first occlusion indication information may be referred to as a feature mask.

In some embodiments, the determining of the first occlusion indication information may be a classification process. The image feature is further processed, and then the processed image feature is classified to obtain the first occlusion indication information. In some embodiments, the electronic device convolves the first overall image feature, classifies the convolved image feature, and determines the first occlusion indication information corresponding to the first overall image feature.

In some embodiments, the process of determining the first occlusion indication information is implemented by a decoder. When the first occlusion indication information is in the form of a mask, the decoder may also be referred to as a mask decoder. The mask decoder is configured to map the image feature (or referred to as convolutional feature) to a corresponding feature mask.

Figure 10:
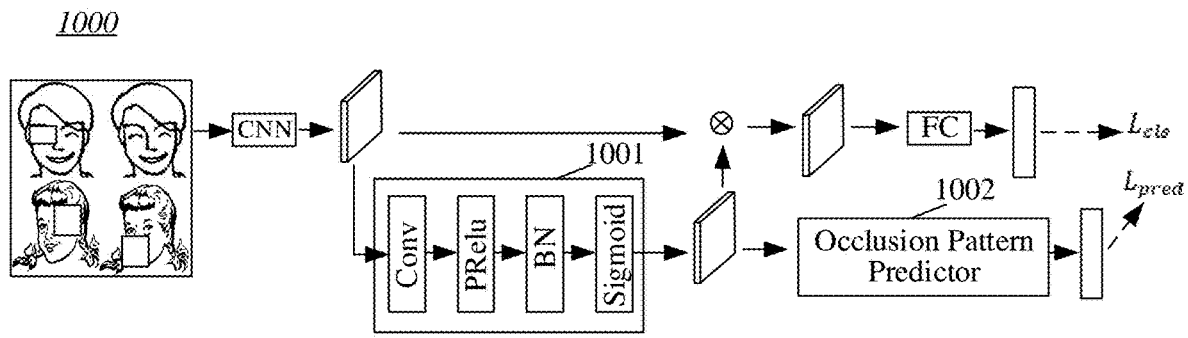
FIG. 10 is a schematic structural diagram of an image processing model according to an embodiment of this application.
Figure 11:
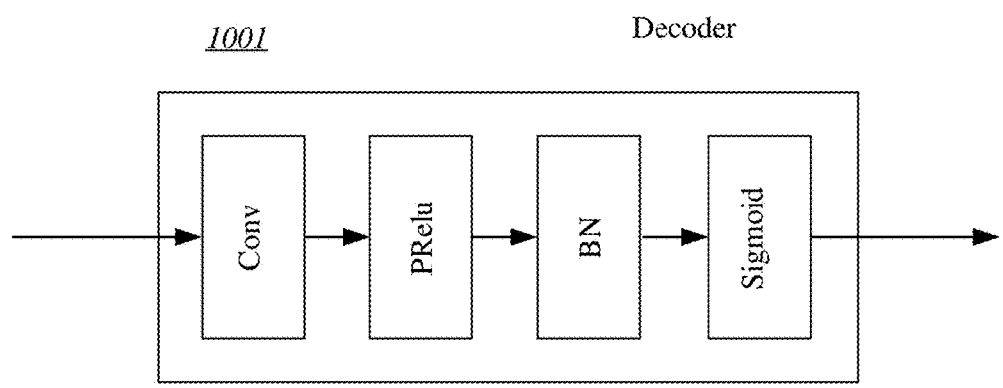
FIG. 11 is a schematic structural diagram of a decoder according to an embodiment of this application.

In some embodiments, the structure of the image processing model 1000 may be as shown in FIG. 10. The decoder 1001 includes a Convolution (Cony) layer, a Parametric Rectified Linear Unit (PRelu) layer, a Batch Normalization (BN) layer and Sigmoid layer. The decoder 1001 can first perform convolve the image feature, perform linear rectification processing on a result of the convolution, and then perform batch normalization processing. The Sigmoid layer predicts a probability that each image feature is to be retained (that is, not to be removed, and not affected by the face occlusion area), and obtain the first occlusion indication information (that is, the feature mask). It can be understood that, the image feature can be mapped to a range of [0, 1] through the Sigmoid layer. The probability that each image feature is to be retained is negatively correlated to the probability that each image feature is affected by the face occlusion area. The process of prediction through the sigmoid layer is essentially to predict the probability that each image feature is affected by the face occlusion area. A higher probability that each image feature is affected by the face occlusion area indicates a lower probability that the image feature is to be retained, and a smaller value of the corresponding bit in the first occlusion indication information, i.e., closer to 0. On the contrary, a lower probability that each image feature is affected by the face occlusion area indicates a higher probability that the image feature is to be retained, and a larger value of the corresponding bit in the first occlusion indication information, i.e., closer to 1. The structure of the decoder 1001 may be as shown in FIG. 11.

The decoder 1001 decodes a corresponding feature mask $M_1$ from the feature $X_1$ generated by the convolutional network. $M_1$ has a function of finding polluted feature elements from $X_1$, and multiplying the two to remove these elements to obtain a clean feature $X_1'$, which is to be used for subsequent recognition tasks.

Steps 601 and 602 are a process of obtaining the image feature of the first sample face image and the first occlusion indication information corresponding to the image feature based on the image processing model. In the above process, the manner of performing feature extraction and the manner of determining the first occlusion indication information have been described. In some embodiments, the first occlusion indication information may also be determined without reference to the image feature, but instead, the first sample face image is directly processed to determine the corresponding first occlusion indication information. This is not limited in the embodiments of this application.

603. The electronic device performs face recognition based on the image feature of the first sample face image and the first occlusion indication information to obtain a predicted recognition result of the first sample face image.

After determining the first occlusion indication information, the electronic device knows which image features in the first overall image feature are affected by the face occlusion area, and therefore may remove this part of image features and then perform face recognition. In this way the recognition result is not affected by the face occlusion area, and is more accurate.

In some embodiments, step 603 can be implemented by the following steps 6031 and 6032.

6031. Remove the image feature of the face occlusion area from the first overall image feature based on the first occlusion indication information to obtain a first target image feature.

Because the first occlusion indication information already indicates the image features affected by the face occlusion area, the first overall image feature can be processed based on the first occlusion indication information to remove the affected image features, so that the impact of face occlusion can be eliminated, thereby achieving an accurate face recognition process.

In some embodiments, the removal process may be: multiplying, by the electronic device, the first overall image feature and the first occlusion indication information to obtain the first target image feature. The first occlusion indication information may be in the form of a matrix or a vector. If a particular image feature is greatly affected, the value of the bit in the first occlusion indication information that corresponds to the image feature is relatively small. After multiplication, the value corresponding to the image feature becomes smaller. In this way, the image feature affected by the face occlusion area in the first target image feature is weakened and can hardly be reflected, thereby achieving the removal effect.

6032: Perform face recognition on the first sample face image according to the first target image feature to obtain the predicted recognition result.

After obtaining the first target image feature, the electronic device may perform face recognition to determine a recognition result of the first sample face image. In some embodiments, the face recognition process may be a classification process, for determining the identity of the face through classification or determining a face attribute or type through classification.

In some embodiments, the classification process is obtaining the matching degrees between the first target image feature and the candidate face image features, and determining the recognition result corresponding to the candidate face image feature with the largest matching degree as the predicted recognition result.

For example, after a feature vector is extracted through a fully connected layer, a cosine similarity between the feature vector $f_p$ of the test face (that is, the first target image feature) and face feature vectors $\{f_{g_i}\}$ in a database is calculated:

$$s(p, g_i) = \frac{f_p \cdot f_{g_i}}{\|f_p\| \|f_{g_i}\|}.$$

Generally speaking, there are two scenarios for face recognition: one is a face recognition scenario and the other is a face authentication scenario.

The recognition process may vary with different recognition scenarios. For the face recognition scenario, which face category in the database the test face belongs to may be identified. This scheme uses a nearest neighbor classifier to determine a category of a face with the highest similarity to the test face in the database as the category of the test face. Other classifiers, such as Support Vector Machines (SVM), can also be used.

For the face authentication scenario, whether the test face and a face in the database or another comparison face belong to the same category may be identified. This scheme adopts threshold judgment, that is, when the similarity between the two is higher than a particular threshold, it is considered that they are the same person, or otherwise, it is considered that they are not the same person. It is also possible to learn a classifier for face authentication based on feature vectors.

Step 603 is a process of obtaining the predicted recognition result of the first sample face image. In addition, the image processing model can also obtain the predicted recognition result by other processing methods, for example, directly perform face recognition based on the extracted image feature, which is not particularly limited in the embodiments of this application.

604. The electronic device obtains a recognition error based on the predicted recognition result and a target recognition result corresponding to the first sample face image.

After determining the predicted recognition result, the electronic device may compare the predicted recognition result with the target recognition result to determine a difference between the two, the difference being the recognition error.

In some embodiments, the recognition error can be obtained through a loss function. The loss function can be any loss function, for example, a CosFace classification loss function, a cross-entropy loss function, an L1, L2 equidistance regression loss function, an exponential loss function, and the like. In some embodiments, the recognition error can be obtained by the CosFace classification loss function. The method of obtaining the recognition error is not particularly limited in the embodiments of this application.

605. The electronic device obtains first occlusion area information of the first sample face image based on the first occlusion indication information of the first sample face image.

After step 602, the electronic device may further predict the occlusion pattern of the first sample face image according to the first occlusion indication information. During the prediction of the occlusion pattern, matching against the occlusion area information is required. The first occlusion area information is used for indicating whether each area in the first sample face image is occluded. In another way of expression, the first occlusion area information is used for indicating an occlusion status of a plurality of image blocks in the first sample face image.

606. The electronic device matches the first occlusion area information against occlusion area information corresponding to at least two candidate occlusion patterns to obtain at least two matching degrees; and determines a predicted occlusion pattern in the at least two candidate occlusion patterns according to the at least two matching degrees.

In some embodiments, in step 606, the candidate occlusion pattern with the highest matching degree may be determined as the predicted occlusion pattern of the first sample face image.

By comparing the occlusion area information of the first sample face image with the occlusion area information of the candidate occlusion patterns, it is determined which candidate occlusion pattern the first occlusion indication information more conforms to, and the candidate occlusion pattern can be used as the predicted occlusion pattern.

At least two candidate occlusion patterns may be set, that is, there are a plurality of candidate occlusion patterns, and each candidate occlusion pattern corresponds to occlusion area information. The occlusion area information may be established during the division of the occlusion patterns. For example, as for the occlusion area information, if an area is occluded, the value of the bit corresponding to the area may be set to 0. If the area is not occluded, the value of the bit corresponding to the area may be set to 1. As shown in (a) of FIG. 7, the value of each bit element in the occlusion area information of the non-occluded face image 701 may be 1, which is denoted by black. As shown in (b) of FIG. 7, in the occlusion area information of the occluded face image 702, the value of the position belonging to an occluded area is 1, which is denoted by black, and the value of the position belonging to an unobstructed area is 0, which is denoted by white.

In some embodiments, the at least two candidate occlusion patterns may be stored in an occlusion pattern library, and during matching, the electronic device can match the occlusion area information to be matched this time against data in the occlusion pattern library.

In some embodiments, the process of determining the occlusion pattern can be implemented by an occlusion pattern predictor, that is, the occlusion pattern prediction network shown in FIG. 9 or the occlusion pattern predictor 1002 shown in FIG. 10. The occlusion pattern predictor 1002 is the occlusion pattern prediction network. In some embodiments, the occlusion pattern prediction network may adopt a sequential structure of "BN-FC-BN", that is, the occlusion pattern prediction network can first normalize the first occlusion indication information, then convolve the normalized information, and then normalize the convolved information, to obtain the predicted occlusion pattern. The number of dimensions of the data outputted by the occlusion pattern prediction network is the same as the number of occlusion patterns. That is, the predicted occlusion pattern can take the form of a multi-dimensional vector. The number of dimensions are the same as the number of occlusion patterns. For example, if the number of occlusion patterns is 101, the predicted occlusion pattern may be represented by a 101-dimensional vector. The value of each bit element in the vector is used to represent the probability that the occlusion pattern of the first sample face image is the candidate occlusion pattern corresponding to the element.

Step 606 is a process of classifying the occlusion pattern of the first sample face image based on the first occlusion indication information of the first sample face image to obtain the predicted occlusion pattern. In the above process, the first occlusion indication information is converted into the first occlusion area information, which is then matched against the occlusion area information to determine the predicted occlusion pattern. In some embodiments, occlusion indication information of at least two candidate occlusion patterns may be set in the electronic device, and the first occlusion indication information is directly matched against the occlusion indication information of the candidate occlusion patterns. This is not particularly limited in the embodiments of this application.

607. The electronic device obtains a classification error based on the predicted occlusion pattern and the target occlusion pattern corresponding to the first sample face image.

The classification error is used to measure the difference between the predicted occlusion pattern and the target occlusion pattern. The process of obtaining the classification error is similar to step 605, and the classification error may be obtained through a loss function.

In some embodiments, the classification error $L_{pred}$ may be determined using a cross-entropy loss function. For example, the classification error is obtained by the following formula (1):

$$L_{pred} = \frac{1}{N}\sum_{i=1}^{N} -\log p_i = \frac{1}{N}\sum_{i=1}^{N} -\log \frac{e^{f_i}}{\sum_{j=1}^{C} e^{f_i}} \quad (1)$$

where N is the total number of first sample face images participating in training, C is the total number of occlusion patterns, $p_i$ is the probability that the first sample face image $x_i$ is correctly classified, and $f_i$ is the feature vector corresponding to the first sample face image $x_i$. i and j are identifiers, and the values of i and j are both positive integers.

608. The electronic device updates a model parameter of the image processing model according to the recognition error and the classification error.

After obtaining the two errors, the electronic device can update the model parameter based on the two errors, which not only considers the robustness and accuracy of face recognition performed by the image processing model, but also considers the robustness and accuracy of the image processing model in determining the first occlusion information. The performance of the trained model can be improved in both manners.

The update process based on the two errors may include two manners, and the update step can be realized in either of the two manners in the embodiments of this application. Two example embodiments are provided below.

Example 1: The electronic device obtains a product of weights of the classification error and the classification error, using a sum of the product and the recognition error as a target error, and updating the model parameter of the image processing model based on the target error.

In Example 1, a weight may be set for the classification error. The weight of the classification error may be set by relevant technical personnel as required. The weight of the classification error may be a hyperparameter of the model or may be an empirical value obtained from previous model training. For example, the weight may be set to 1. In some other embodiments, the weight may also be updated together with the model parameter in the current model training process, which is not limited in the embodiments of this application.

For example, the process of obtaining the target error $L_{total}$ is realized by the following formula (2):

$$L_{total}=L_{cls}+w*L_{pred} \quad (2)$$

where, $L_{cls}$ is the loss function of face recognition (for example, the CosFace classification loss function); and $L_{pred}$ is the loss function of the predicted occlusion pattern defined by formula (1). w is a weight coefficient used to balance the importance of the two loss functions in the training process. It is found through cross-validation that an optimal recognition effect is achieved when the value of w is 1.0.

Method 2: Calculate a weighted sum of the classification error and the recognition error based on the respective weights of the classification error and the recognition error to obtain a target error, and update the model parameter of the image processing model based on the target error.

In Example 2, a weight is set for each error. The setting of the weight is similar to that in Example 1.

After the image processing model is trained by the above method, the image processing model can provide an image processing function. In some embodiments, in response to an image processing instruction, the electronic device performs feature extraction on a target face image to be recognized based on the image processing model, and performs face recognition based on an extracted second overall image feature and second occlusion indication information corresponding to the second overall image feature to obtain an image recognition result of the target face image. In some embodiments, for an example process of image processing by the image processing model, reference may be made to the embodiment shown in FIG. 14 below.

Figure 12:
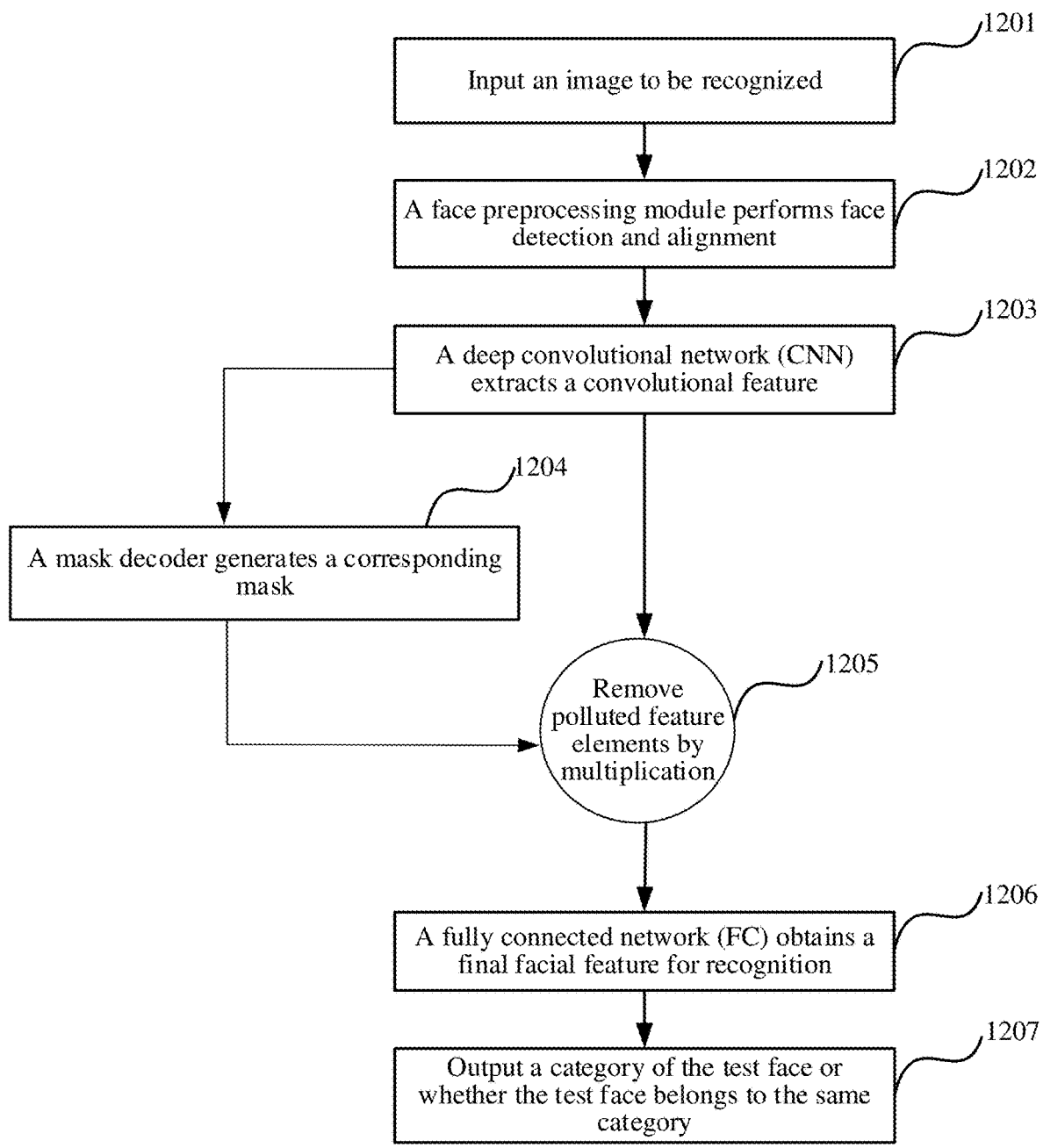
FIG. 12 is a schematic diagram of a process of using an image processing model according to an embodiment of this application.
Figure 13:
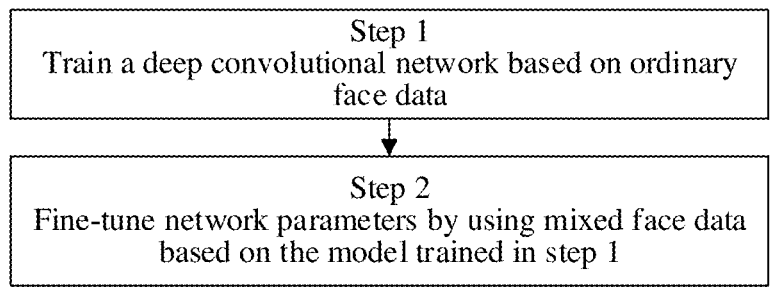
FIG. 13 is a schematic diagram of a process of training an image processing model according to an embodiment of this application.

An example is provided below. A process of using the model may be as shown in FIG. 12. The electronic device may execute step 1201 of inputting an image to be recognized, and then perform face detection and alignment based on the face preprocessing module, that is, execute step 1202. Through step 1202, the preprocessed face image can be obtained. The electronic device may continue to extract a convolutional feature (that is, image feature) based on a deep convolutional network (CNN), that is, execute step 1203. After the convolution feature is extracted, two steps may be performed based on the convolution feature. In step 1204, the electronic device can generate a corresponding mask based on a mask decoder. Then in step 1205, polluted feature elements are removed through multiplication based on the generated mask and the convolutional feature. In step 1206, the electronic device obtains a final face feature for recognition based on the fully connected network (FC). Finally, in step 1207, the electronic device may output a category of the test face or whether they belong to the same category. The model training process may also be as shown in FIG. 13. The training process may include two steps. In step 1, a deep convolutional network is trained based on ordinary face data. In step 2, network parameters are fine-tuned by using mixed face data based on the model trained in step 1.

In the embodiments of this application, with the introduction of occlusion patterns, the predicted occlusion pattern of the first sample face image is determined according to the first occlusion indication information generated in the face recognition process, and is compared with the target occlusion pattern marked on the first sample face image. In this way, the image processing model can be trained to output more accurate first occlusion indication information, and then perform face recognition based on the accurate first occlusion indication information to obtain a more accurate recognition result. In other words, the image processing model can more accurately process a face image where a face is occluded, that is, the image processing model provides higher robustness. On the other hand, the image processing model can directly perform feature extraction on the first sample face image and then perform face recognition based on the extracted image feature and the first occlusion indication information corresponding to the image feature, and can perform image processing end-to-end without the aid of an external network, thereby significantly reducing the amount of calculation, increasing the operation speed of the device, and reducing the number of models. Because the image processing accuracy of the image processing model is not affected by external network factors, the accuracy is significantly improved.

Figure 14:
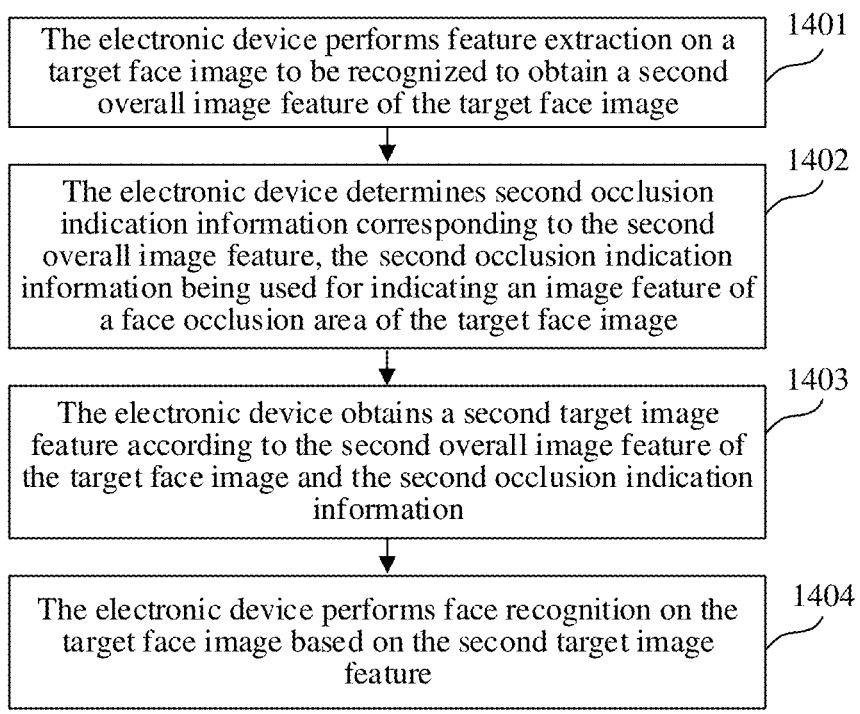
FIG. 14 is a flowchart of an image processing method according to an embodiment of this application.

The above embodiments shown in FIG. 3 and FIG. 6 have described the process of training the image processing model. After the training is completed, the image processing model can be used for image processing. The image processing flow can be as shown in FIG. 14 below. FIG. 14 is a flowchart of an image processing method according to an embodiment of this application. Referring to FIG. 14, the method includes the following steps:

1401. An electronic device performs feature extraction on a target face image to be recognized to obtain a second overall image feature of the target face image.

Step 1401 is similar to the process of obtaining the first overall image feature in step 601.

In some embodiments, the electronic device first preprocesses the target face image, and then performs feature extraction on the preprocessed target face image to obtain the second overall image feature of the target face image.

In some embodiments, the preprocessing process may be: the electronic device performs face detection on the target face image, and crops the target face image based on a result of the face detection to obtain the preprocessed target face image.

1402. The electronic device determines second occlusion indication information corresponding to the second overall image feature, the second occlusion indication information being used for indicating an image feature of a face occlusion area of the target face image.

Step 1402 is similar to the foregoing step 602.

In some embodiments, the process of determining the second occlusion indication information may be: the electronic device convolves the second overall image feature, and classifies the convolved image feature to obtain the second occlusion indication information.

1403. The electronic device obtains a second target image feature according to the second overall image feature of the target face image and the second occlusion indication information.

1404. The electronic device performs face recognition on the target face image based on the second target image feature.

Steps 1403 and 1404 are similar to steps 6011 and 6012 in step 603.

In some embodiments, step 1403 may be: the electronic device removes the image feature of the face occlusion area from the second overall image feature based on the second occlusion indication information to obtain the second target image feature.

In some embodiments, the removal may be realized by multiplication, i.e., the electronic device multiplies the second overall image feature and the second occlusion indication information to obtain the second target image feature.

In some embodiments, the image processing method may be implemented by an image processing model. The electronic device may input the target face image into an image processing model, so that the image processing model executes the feature extraction, the determining of the second occlusion indication information, the obtaining of the second target image feature, and the face recognition, and outputs a recognition result.

All of the above example embodiments can be combined and/or modified to form additional embodiments of this application.

Figure 15:
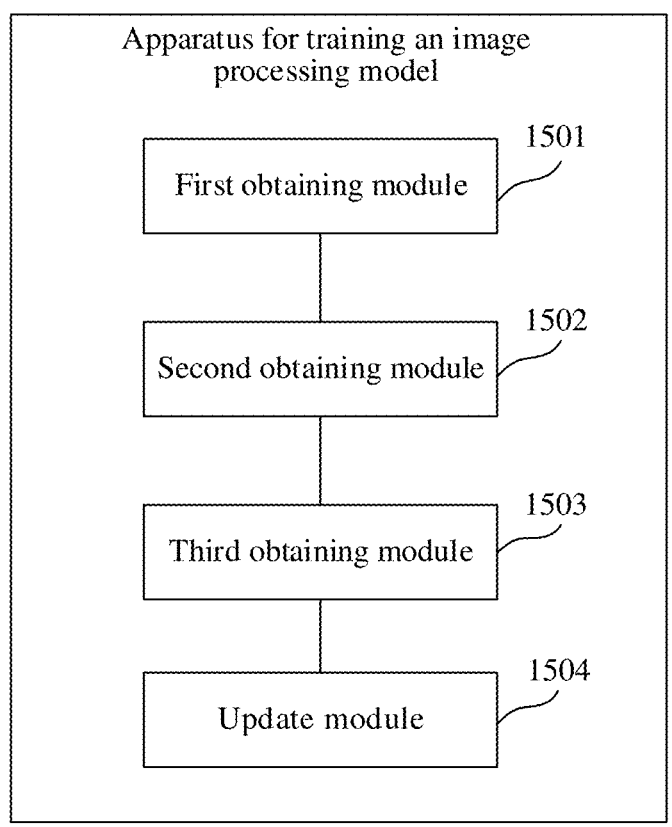
FIG. 15 is a schematic structural diagram of an apparatus for training an image processing model according to an embodiment of this application.

FIG. 15 is a schematic structural diagram of an apparatus for training an image processing model according to an embodiment of this application. Referring to FIG. 15, the apparatus includes:

a first obtaining module 1501, configured to obtain a predicted recognition result of a first sample face image and first occlusion indication information based on an image processing model, the first occlusion indication information being used for indicating an image feature of a face occlusion area of the first sample face image;

a second obtaining module 1502, configured to obtain a recognition error based on the predicted recognition result and a target recognition result corresponding to the first sample face image;

a third obtaining module 1503, configured to obtain a classification error based on the first occlusion indication information and a target occlusion pattern corresponding to the first sample face image, an occlusion pattern of the first sample face image being used for indicating a position and a size of the face occlusion area; and an update module 1504, configured to update a model parameter of the image processing model according to the recognition error and the classification error.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In some embodiments, the third obtaining module 1503 is configured to execute the following operations:

determining a predicted occlusion pattern of the first sample face image based on the first occlusion indication information; and obtaining the classification error based on the predicted occlusion pattern and the target occlusion pattern.

In some embodiments, the third obtaining module 1503 is configured to execute the following operations:

obtaining first occlusion area information based on the first occlusion indication information, the first occlusion area information being used for indicating an occlusion status of a plurality of image blocks in the first sample face image;

matching the first occlusion area information against occlusion area information corresponding to at least two candidate occlusion patterns to obtain at least two matching degrees; and determining the predicted occlusion pattern in the at least two candidate occlusion patterns according to the at least two matching degrees.

In some embodiments, the update module 1504 is configured to execute any one of:

obtaining a product of weights of the classification error and the classification error, using a sum of the product and the recognition error as a target error, and updating the model parameter of the image processing model based on the target error; or calculating a weighted sum of the classification error and the recognition error based on the respective weights of the classification error and the recognition error to obtain a target error, and updating the model parameter of the image processing model based on the target error.

In some embodiments, the first obtaining module 1501 includes: a first obtaining unit and a recognition unit.

The first obtaining unit is configured to obtain a first overall image feature of the first sample face image and first occlusion indication information corresponding to the first overall image feature based on the image processing model.

The recognition unit is configured to perform face recognition based on the first overall image feature and the first occlusion indication information to obtain the predicted recognition result of the first sample face image.

In some embodiments, the first obtaining unit includes: a feature extraction subunit and a determination subunit.

The feature extraction subunit is configured to perform feature extraction on the first sample face image based on the image processing model to obtain the first overall image feature.

The determination subunit is configured to determine the first occlusion indication information corresponding to the first overall image feature.

In some embodiments, the feature extraction subunit is configured to execute the following operations:
convolving the first overall image feature; and
classifying the convolved image feature to obtain the first occlusion indication information.

In some embodiments, the recognition unit includes: a removal subunit and a recognition subunit.

The removal subunit is configured to remove the image feature of the face occlusion area from the first overall image feature based on the first occlusion indication information to obtain a first target image feature.

The recognition subunit is configured to perform face recognition on the first sample face image according to the first target image feature to obtain the predicted recognition result.

In some embodiments, the removal subunit is configured to multiply the first overall image feature and the first occlusion indication information to obtain the first target image feature.

In some embodiments, the first obtaining unit further includes a preprocessing subunit.

The preprocessing subunit is configured to preprocess the first sample face image based on the image processing model.

The feature extraction subunit and the determination subunit are configured to obtain the first overall image feature and the first occlusion indication information based on the preprocessed first sample face image.

In some embodiments, the preprocessing subunit is configured to execute the following operations:
performing face detection on the first sample face image based on the image processing model; and
cropping the first sample face image based on a result of the face detection to obtain the preprocessed first sample face image.

In some embodiments, the image processing model includes a convolutional neural network, a decoder, a recognition network, and an occlusion pattern prediction network;

the convolutional neural network is configured to execute the preprocessing and the operation of obtaining the first overall image feature;

the decoder is configured to execute the operation of obtaining the first occlusion indication information;

the recognition network is configured to perform the face recognition based on the first overall image feature and the first occlusion indication information to obtain the predicted recognition result of the first sample face image; and the occlusion pattern prediction network is configured to determine a predicted occlusion mode of the first sample face image based on the first occlusion indication information.

In some embodiments, the apparatus further includes a training module. The training module is configured to train the convolutional neural network based on a second sample face image, a face in the second sample face image being not occluded.

In some embodiments, the apparatus further includes a recognition module. The recognition module is configured to, in response to an image processing instruction, perform feature extraction on a target face image to be recognized based on the image processing model, and perform face recognition based on an extracted second overall image feature and second occlusion indication information corresponding to the second overall image feature to obtain an image recognition result of the target face image.

In the embodiments of this application, with the introduction of occlusion patterns, the predicted occlusion pattern of the first sample face image is determined according to the first occlusion indication information generated in the face recognition process, and is compared with the target occlusion pattern corresponding to the first sample face image. In this way, the image processing model can be trained to determine more accurate first occlusion indication information, and then perform face recognition based on the accurate first occlusion indication information to obtain a more accurate recognition result. Therefore, the image processing model can more accurately process a face image where a face is occluded, that is, the image processing model provides higher robustness. In other words, the image processing model can directly process the first sample face image to obtain a recognition result, and can perform image processing end-to-end without the aid of an external network, thereby significantly reducing the amount of calculation, increasing the operation speed of the device, and effectively reducing the number of models. Because the image processing accuracy of the image processing model is not affected by external network factors, the accuracy is significantly improved.

When the apparatus for training an image processing model provided by the above embodiments trains an image processing model, the description is given by taking the above division of functional modules as an example. In practice, the above functions may be assigned to be implemented by different functional modules according to needs, i.e., the internal structure of the apparatus for training an image processing model may be divided into different functional modules to implement all or part of the functions described above. In addition, the apparatus for training an image processing model provided by the above embodiments belongs to the same concept as the embodiments of the method for training an image processing model. For example implementation processes, reference may be made to the method embodiments described herein.

Figure 16:
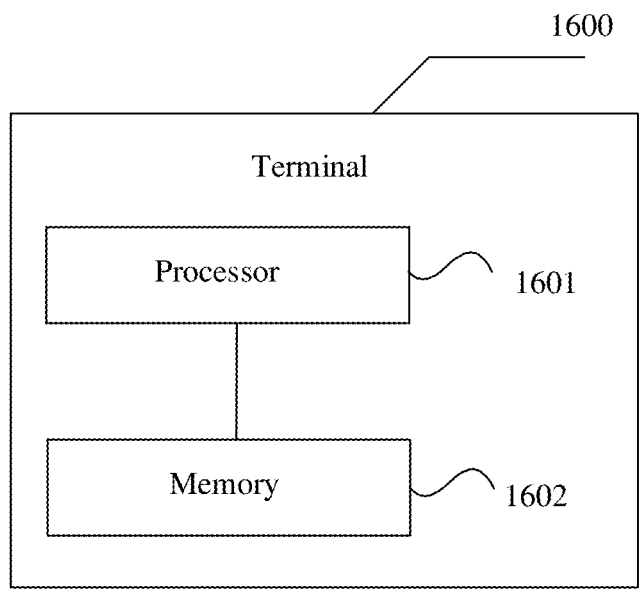
FIG. 16 is a schematic structural diagram of a terminal according to an embodiment of this application.

The electronic device in the above method embodiments can be implemented as a terminal. For example, FIG. 16 is a schematic structural diagram of a terminal according to an embodiment of this application. The terminal 1600 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1600 may also be referred to by other names as user equipment, a portable terminal, a laptop terminal, a desktop terminal, etc.

Generally, the terminal 1600 includes: a processor 1601 and a memory 1602.

The processor 1601 may include one or more processing cores, such as a 4-core processor or an 8-core processor. The processor 1601 may be implemented by at least one hardware form in a digital signal processing (DSP), a field-programmable gate array (FPGA), and a programmable logic array (PLA). The processor 1601 may also include a main processor and a co-processor. The main processor is a processor for processing data in a wake-up state, also referred to as a central processing unit (CPU). The coprocessor is a low power consumption processor configured to process data in a standby state. In some embodiments, the processor 1601 may be integrated with a graphics processing unit (GPU). The GPU is configured to render and draw content to be displayed on a display screen. In some embodiments, the processor 1601 may also include an AI processor for processing computing operations related to machine learning.

The memory 1602 may include one or more non-transitory computer-readable storage media, which may be non-transitory. The memory 1602 may also include a high-speed random access memory, as well as non-volatile memory, such as one or more disk storage devices and flash storage devices. In some embodiments, the non-transitory computer-readable storage medium in the memory 1602 is configured to store at least one instruction, the at least one instruction being configured to be executed by the processor 1601 to perform the method for training an image processing model or the image processing method in the method embodiments of this application.

It will be appreciated by those skilled in the art that the structure shown in FIG. 16 is not limiting of the terminal 1600 and may include more or fewer assemblies than illustrated, or some assemblies may be combined, or different assembly arrangements may be employed.

Figure 17:
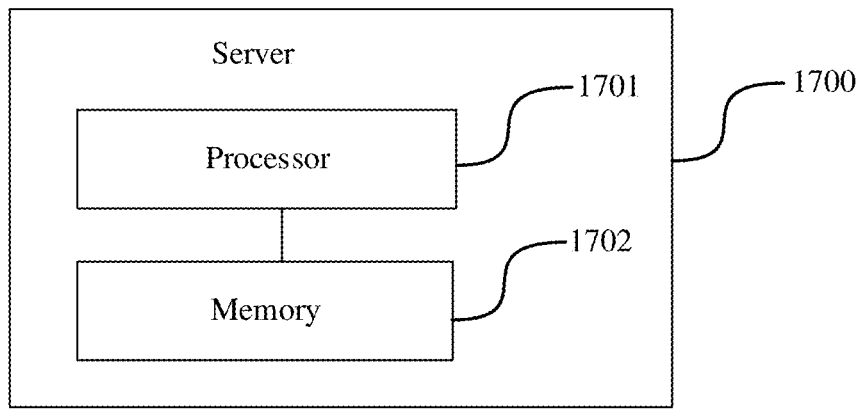
FIG. 17 is a schematic structural diagram of a server according to embodiment of this application.

The electronic device in the above method embodiments can be implemented as a terminal. For example, FIG. 17 is a schematic structural diagram of a server according to an embodiment of this application. The server 1700 may vary depending on different configurations or performance, and can include one or more processors (CPUs) 1701 and one or more memories 1702. The memory 1702 stores at least one program, code, or instruction, the at least one program, code, or instruction being loaded and executed by the processor 1701 to implement the method for training an image processing model or the image processing method in the above method embodiments. The server may also have components such as a wired or wireless network interface and an input/output interface for ease of input/output, and may further include other components for implementing functions of the device.

In some embodiments, a non-transitory computer-readable storage medium is also provided, which is, for example, a memory storing at least one program code, the at least one program code being executed by a processor to implement the method for training an image processing model or the image processing method in the above embodiments. For example, the non-transitory computer-readable storage medium may be a read-only memory (ROM), a random access memory (RAM), a compact disc read-only memory (CD-ROM), magnetic tape, a floppy disk, an optical data storage device, or the like.

In some embodiments, a computer program product or a computer program is further provided, including one or more pieces of program code, the one or more pieces of program code being stored in a non-transitory computer-readable storage medium. One or more processors of an electronic device read the one or more program codes from the non-transitory computer-readable storage medium, and execute the one or more program codes, to cause the electronic device to execute the method for training an image processing model or the image processing method.

What is claimed is:

1. A method for training an image processing model, the method comprising:
    predicting a predicted recognition result of a sample face image;
    obtaining occlusion indication information of the sample face image based on an image processing model, the occlusion indication information indicating an image feature affected by a face occlusion area of the sample face image;
    obtaining a true recognition result and a true occlusion pattern corresponding to the sample face image;
    obtaining a recognition error based on the predicted recognition result and the true recognition result;
    obtaining a classification error based on the occlusion indication information and the true occlusion pattern, wherein the true occlusion pattern of the sample face image indicates a position and a size of the face occlusion area in the sample face image;
    updating a model parameter of the image processing model according to the recognition error and the classification error; and
    determining an updated occlusion indication information of the sample face image to reduce the classification error;
    wherein the obtaining the classification error comprises determining a predicted occlusion pattern of the sample face image based on the occlusion indication information and obtaining the classification error based on the predicted occlusion pattern and the true occlusion pattern; and
    wherein the predicting the predicted recognition result comprises obtaining an overall image feature of the sample face image and the occlusion indication information corresponding to the overall image feature based on the image processing model and performing face recognition based on the overall image feature and the occlusion indication information to predict the predicted recognition result of the sample face image.

2. The method according to claim 1, wherein the determining the predicted occlusion pattern further comprises:
    obtaining occlusion area information based on the occlusion indication information, the occlusion area information indicating an occlusion status of a plurality of image blocks of the sample face image;
    matching the occlusion area information to occlusion area information from at least two candidate occlusion patterns to obtain at least two matching degrees; and determining the predicted occlusion pattern in the at least two candidate occlusion patterns based on the at least two matching degrees.

3. The method according to claim 1, wherein the updating the model parameter comprises any one of:
calculating a product of the classification error and a weight of the classification error, calculating a calculated error based on a sum of the product and the recognition error, and updating the model parameter of the image processing model based on the calculated error; or
calculating a calculated error based on a weighted sum of the classification error and the recognition error, and updating the model parameter of the image processing model based on the calculated error.

4. The method according to claim 1, wherein the obtaining the overall image feature comprises:
performing feature extraction on the sample face image based on the image processing model to obtain the overall image feature; and
determining the occlusion indication information corresponding to the overall image feature.

5. The method according to claim 4, wherein the determining the occlusion indication information comprises:
convolving the overall image feature; and
classifying the convolved image feature to obtain the occlusion indication information.

6. The method according to claim 1, wherein the performing face recognition comprises:
removing the image feature of the face occlusion area from the overall image feature based on the occlusion indication information to obtain a image feature; and
performing face recognition on the sample face image based on the image feature to obtain the predicted recognition result.

7. The method according to claim 1, wherein the obtaining the overall image feature of the sample face image and the occlusion indication information comprises:
preprocessing the sample face image based on the image processing model; and
obtaining the overall image feature and the occlusion indication information based on the preprocessed sample face image.

8. The method according to claim 7, wherein the preprocessing the sample face image comprises:
performing face detection on the sample face image based on the image processing model; and
cropping the sample face image based on the performed face detection to obtain the preprocessed sample face image.

9. The method according to claim 7, wherein the image processing model comprises a convolutional neural network, a decoder, a recognition network, and an occlusion pattern prediction network, and wherein:
the convolutional neural network is configured to execute the preprocessing and the obtaining the overall image feature;
the decoder is configured to execute the obtaining the occlusion indication information;
the recognition network is configured to perform the face recognition; and
the occlusion pattern prediction network is configured to determine a predicted occlusion mode of the sample face image based on the occlusion indication information.

10. The method according to claim 9, the method further comprising:
training the convolutional neural network based on a non-occluded sample face image, a face in the non-occluded sample face image being not occluded.

11. The method according to claim 6, wherein the removing the image feature comprises:
multiplying the overall image feature and the occlusion indication information to obtain the image feature.

12. An image processing method, the method comprising:
performing, in response to an image processing instruction, feature extraction on a face image to obtain an overall image feature of the face image;
determining occlusion indication information corresponding to the overall image feature, the occlusion indication information indicating an image feature of a face occlusion area affected by the face image;
obtaining an image feature by removing the image feature of the face occlusion area from the overall image feature based on the occlusion indication information; and
performing face recognition on the face image based on the image feature using an image processing model, the image processing model being obtained through training by:
predicting a predicted recognition result of a sample face image;
obtaining occlusion indication information of the sample face image based on an image processing model, the occlusion indication information indicating the image feature affected by the face occlusion area of the sample face image;
obtaining a true recognition result and a true occlusion pattern corresponding to the sample face image;
obtaining a recognition error based on the predicted recognition result and the true recognition result;
obtaining a classification error based on the occlusion indication information and the true occlusion pattern, wherein the true occlusion pattern of the sample face image indicates a position and a size of the face occlusion area in the sample face image;
updating a model parameter of the image processing model according to the recognition error and the classification error; and
determining an updated occlusion indication information of the sample face image to reduce the classification error;
wherein the obtaining the classification error comprises determining a predicted occlusion pattern of the sample face image based on the occlusion indication information and obtaining the classification error based on the predicted occlusion pattern and the true occlusion pattern; and
wherein the predicting the predicted recognition result comprises obtaining an overall image feature of the sample face image and the occlusion indication information corresponding to the overall image feature based on the image processing model and performing face recognition based on the overall image feature and the occlusion indication information to predict the predicted recognition result of the sample face image.

13. The method according to claim 12, the method further comprising:
inputting the face image into an image processing model such that the image processing model executes the performing the feature extraction, the determining the occlusion indication information, the obtaining the image feature, and the performing the face recognition, and an outputting a recognition result.

14. An electronic device comprising at least one processor and at least one memory, the at least one memory storing at least one program code, the at least one program code being loaded and executed by the at least one processor to implement a method comprising:
- predicting a predicted recognition result of a sample face image;
- obtaining occlusion indication information of the sample face image based on an image processing model, the occlusion indication information indicating an image feature affected by a face occlusion area of the sample face image;
- obtaining a true recognition result and a true occlusion pattern corresponding to the sample face image;
- obtaining a recognition error based on the predicted recognition result and the true recognition result;
- obtaining a classification error based on the occlusion indication information and the true occlusion pattern, wherein the true occlusion pattern of the sample face image indicating a position and a size of the face occlusion area in the sample face image;
- updating a model parameter of the image processing model based the recognition error and the classification error; and
- determining an updated occlusion indication information of the sample face image to reduce the classification error;
- wherein the obtaining the classification error comprises determining a predicted occlusion pattern of the sample face image based on the occlusion indication information and obtaining the classification error based on the predicted occlusion pattern and the true occlusion pattern; and
- wherein the predicting the predicted recognition result comprises obtaining an overall image feature of the sample face image and the occlusion indication information corresponding to the overall image feature based on the image processing model and performing face recognition based on the overall image feature and the occlusion indication information to predict the predicted recognition result of the sample face image.

15. An electronic device comprising at least one processor and at least one memory, the at least one memory storing at least one program code, the at least one program code being loaded and executed by the at least one processor to implement the image processing method according to claim 12.

16. A non-transitory computer-readable storage medium, storing at least one program code, the at least one program code being loaded and executed by a processor to implement the method for training an image processing model according to claim 1.

17. A non-transitory computer-readable storage medium, storing at least one program code, the at least one program code being loaded and executed by a processor to implement the image processing method according to claim 12.

18. The electronic device of claim 14, wherein the determining the predicted occlusion pattern further comprises:
- obtaining occlusion area information based on the occlusion indication information, the occlusion area information indicating an occlusion status of a plurality of image blocks of the sample face image;
- matching the occlusion area information to occlusion area information from at least two candidate occlusion patterns to obtain at least two matching degrees; and
- determining the predicted occlusion pattern in the at least two candidate occlusion patterns based on the at least two matching degrees.

19. The method according to claim 1, wherein the occlusion indication information is a feature vector comprising bit elements, wherein a value of each bit element in the feature vector indicates a probability that an image feature element is affected by the face occlusion area.

20. The method according to claim 1, wherein the determining the predicted occlusion pattern further comprises determining a plurality of occlusion patterns according to different face occlusion areas.

* * * * *